Oct. 9, 1934.    T. W. CASE    1,975,768
SOURCE OF LIGHT
Filed Nov. 19, 1927    2 Sheets-Sheet 1
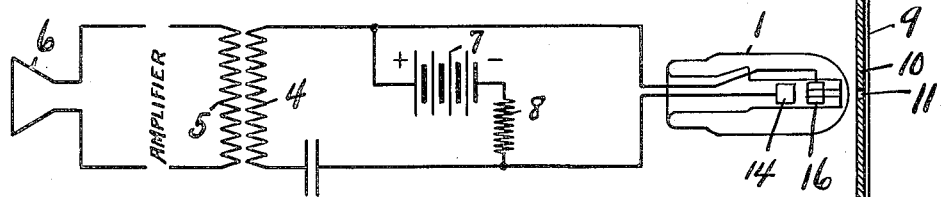
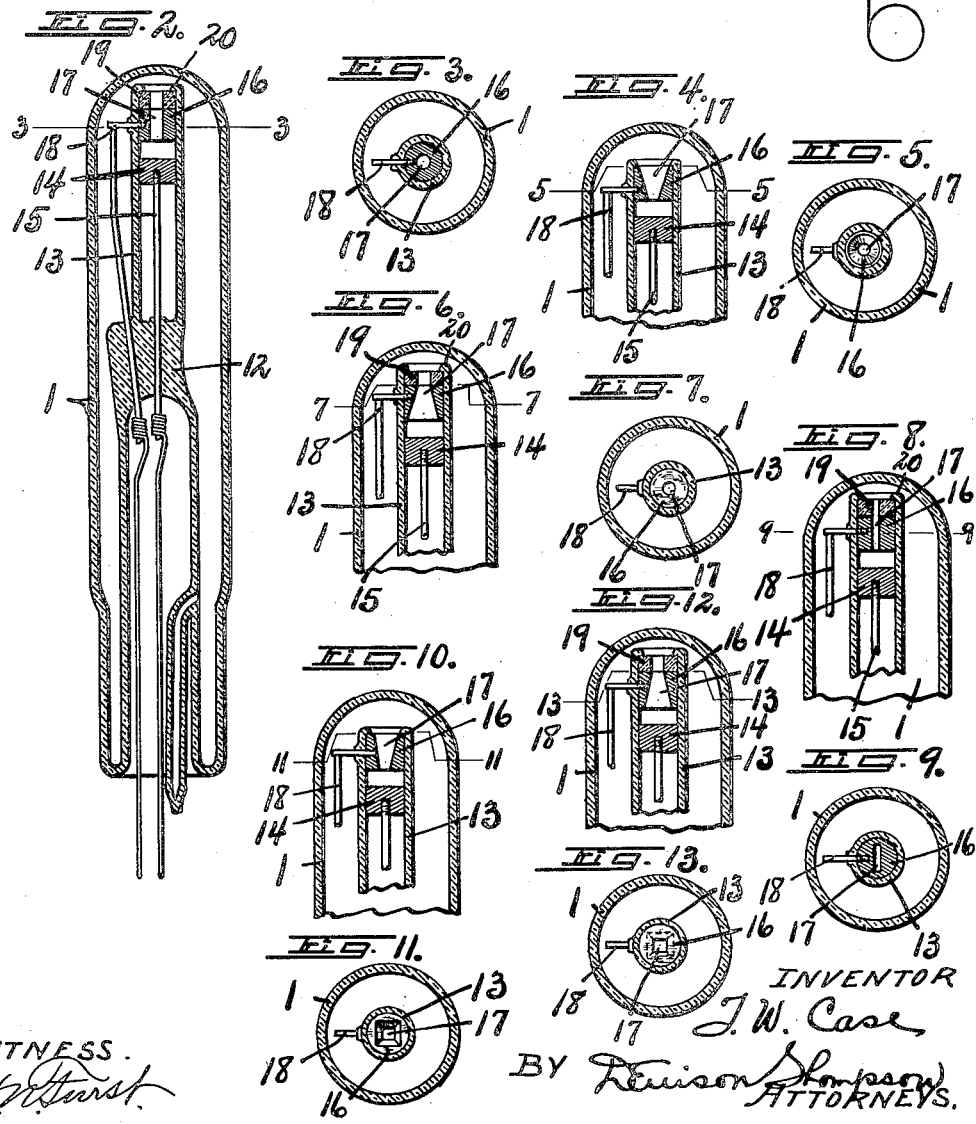

Oct. 9, 1934.  T. W. CASE  1,975,768
SOURCE OF LIGHT
Filed Nov. 19, 1927  2 Sheets-Sheet 2
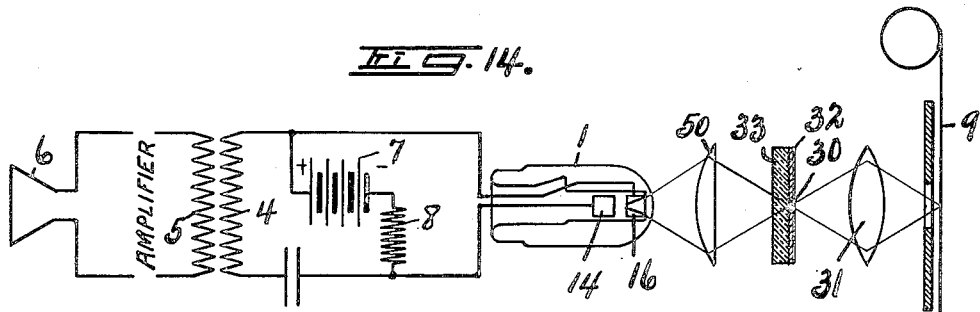
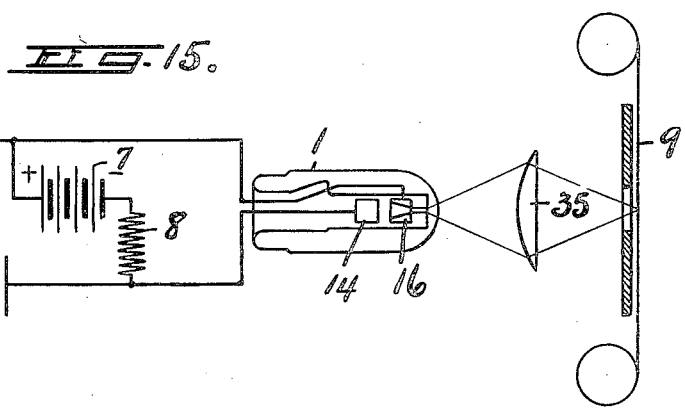
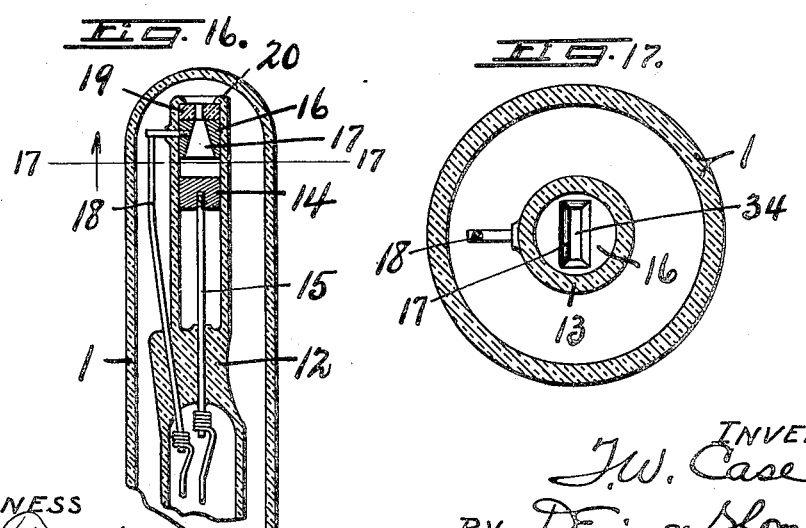

Patented Oct. 9, 1934

1,975,768

UNITED STATES PATENT OFFICE

1,975,768

SOURCE OF LIGHT

Theodore Willard Case, Auburn, N. Y., assignor to Case Research Laboratory Inc., Auburn, N. Y., a corporation of New York

Application November 19, 1927, Serial No. 234,536

17 Claims. (Cl. 176—122)

This invention relates to certain new and useful improvements in sources of light for producing a photographic record of light wave variations as produced by electrical variations corresponding to sound wave variations.

In the production of such photographic records the excellence of the picture depends to a considerable extent upon the intensity of the light used in producing the picture, and the main object of this invention is the production of a concentrated source of light of very high intensity and which instantaneously and sharply varies its intensity in accordance with electrical variations in the circuit energizing it.

Other objects and advantages relate to the details of the structure and the form and relation of the parts thereof, all as will more fully appear from the following description taken in connection with the accompanying drawings, in which:

Figure 1 is a diagrammatic illustration of a source of light of this invention associated with suitable circuits for modulation in accordance with sound frequencies.

Figure 2 is a sectional view through a source of light of this invention.

Figure 3 is a section on line 3—3, Figure 2.

Figure 4 illustrates a slightly modified form of source of light.

Figure 5 is a section on line 5—5, Figure 4.

Figure 6 is a section through a further modified form.

Figure 7 is a section on line 7—7, Figure 6.

Figure 8 is a section through a further modified form.

Figure 9 is a section on line 9—9, Figure 8.

Figure 10 is a section through a further modified form.

Figure 11 is a section on line 11—11, Figure 10.

Figure 12 is a section through a further modified form.

Figure 13 is a section on line 13—13, Figure 12.

Figure 14 is a diagrammatic illustration showing the use of a particular form of source of light in producing a photographic record.

Figure 15 is a diagrammatic illustration of a somewhat different form of source of light and the associated parts utilizable with it for producing a photographic record.

Figure 16 is a section through the lamp of Figure 15.

Figure 17 is a section on line 17—17, Figure 16.

Generally described, the source of light of this invention includes a bulb or tube 1 containing a pair of spaced electrodes 14 and 16 connected in a modulated circuit, as for instance to the secondary 4 of a transformer, the primary 5 of which through any number of stages of amplification is connected to a microphone 6 for modulating the circuit in accordance with sound wave variations.

Means is provided for maintaining the lamp constantly lighted, as for instance in the form of a source of potential 7 and a comparatively high resistance 8 preferably connected across the secondary 4 of a transformer.

The photographic record may be produced upon a film 9 moving at the rear of an opaque wall 10 having an extremely narrow elongated slit 11 formed for the passage of light.

In the form of the lamp shown in Figures 2 and 3 the stem 12 of the tube 1 is provided with an extension in the form of a tubular cylinder 13 rising from the stem and preferably terminating at a point adjacent the end of the tube 1. This cylinder is formed of insulating material and may perhaps preferably be of glass having a low co-efficient of expansion.

Within the cylinder 13 and preferably tightly fitted therein is a solid cylindrical anode or disk electrode 14 which may have in its lower side a threaded recess into which the threaded end of the lead 15 may be screwed. The tubular cylinder 13 further contains a cathode 16 preferably fitted tightly within the cylinder 13 and spaced from the anode 14. This cathode 16 is formed with an axial perforation or capillary 17 which in the form illustrated in Fig. 3 is of circular cross-section and centrally disposed within the electrode, and as the electrodes 16 and 14 are axially aligned, the hole or conduit 17 is aligned with the central portion of the anode 14. The cathode 16 may be formed with an internally threaded radial recess into which the threaded end of lead 18 may be screwed, the lead projecting through the cylinder 13. In order to assist in keeping any glow from spreading upon the upper end of the cathode 16 and restricting the effective glow to the conduit or capillary 17, an insulating washer 19, as for instance preferably of glass or the like, is disposed in contact with the outer surface of the electrode 16, and is provided with an opening aligned with and preferably of the same diameter as the diameter of the capillary 17.

For illustration, a suitable diameter is $\frac{1}{10}$th of an inch. The upper end of the cylinder 13 may be rolled in upon the outer surface of the insulating washer 19, as shown at 20 for maintaining the washer in place. The leads 15 and 18 are connected to the opposite terminals of the secondary 4 of the transformer. The electrode 16 is of considerable axial length so as to produce a conduit 17 of considerable length, and as here illustrated a satisfactory length is approximately ¼th of an inch in which conduit or capillary the effective intense glow is produced.

In use the photographic record is taken from the end of the tube 1 and the tube contains a gas such as helium of high heat conductivity which assists in maintaining the electrode comparatively cool during operation. Other gases may, however, be used, such as hydrogen, and some advantages may be obtained by a mixture of gases. The gas in the tube 1 is at such a pressure that the glow is maintained in the capillary or conduit 17 and preferably does not pass out of the capillary toward the end of the tube 1. A suitable material for the electrodes 14 and 16 is aluminum, although various other materials can be used. In the use of this lamp any sputtering of the electrodes is confined to substantially the space between the electrodes and there is no sputtering at the end of the tube 1 which would tend to darken or render the end of the tube opaque, and for that reason the source of light of this invention is capable of use for long periods of time.

The most essential feature of this invention resides in a cathode having a capillary or conduit therethrough within which there is produced an extremely intense concentrated light capable of instantaneous and sharp variation in accordance with sound modulation because this permits the taking of a photographic record from the end of the tube of the light waves existing in the capillary or conduit 17.

The structures of the succeeding figures are in general the same as that illustrated in Figures 2 and 3, except that the form of the conduit or hole through the cathode 16 is varied and there are certain forms of passages or light-containing conduits preferably for use in producing photographic records in different ways. In Figure 4 the cathode 16 is shown as provided with an inverted conical passageway or conduit while in Figures 6 and 7 the cathode is formed with a conical conduit with the apex of the cone toward the end of the tube. In either of these cases the constriction of the passageway is sufficient at the point of smallest area to produce the desired concentrated highly intense source of light which is used in producing the photographic record.

In Figures 8 and 9 a rectangular slit or conduit is formed through the electrode 16 and the area of the conduit is uniform throughout. In Figures 10 and 11 the electrode 16 is provided with an inverted pyramidal-shaped conduit or passageway, while in Figures 12 and 13 a conduit of similar form is shown through the electrode 16 but with the apex of the pyramid toward the end of the tube 1.

Figure 14 illustrates an apparatus for producing a photographic record by using lamps such as those shown in Figures 4 or 10 in which the conduit flares outwardly toward the end of the tube 1. With this type of lamp it is possible to concentrate the light as by a lens 50 upon a slit 30 and the image of the slit may be focussed by a lens 31 upon the film 9 obviating the use of the limiting slit 11 in the wall 10 of Figure 1.

The slit 30 may be ruled in an opaque layer 32, as for instance a metallic layer deposited upon a glass plate 33. Figure 15 illustrates a method of using the lamps of Figures 16 and 17 in producing a photographic record. In the lamp of Figures 16 and 17 the cathode 16 is formed with a tapered conduit or passageway 17 which terminates at the end of the cathode nearest the end of tube 1 in a narrow elongated slit 34. This slit may be of any desired width and length for use in a manner best suited to produce the desired photographic record. The image of the slit 34 in which the conduit terminates may itself be focussed as by lens 35 directly upon the film, thereby avoiding the necessity of using a separate slit as the slit 30 in Figure 14.

The constructions of sources of light herein illustrated seem to give a rectifying action as approximately five times more current passes through the circuit when the electrode which is the cathode has a hole or conduit through it. If the voltage in the circuit is reversed approximately one-fifth as much current passes through the circuit, and this for the reason that the electrode 14 which then becomes the cathode has no passageway or conduit through it. In the use of the source of light as described herein a more intense concentrated glow is produced in the capillary or conduit 17 for photographic purposes than has been possible with the sources of light heretofore used, and the source of light is maintained constantly luminous at less wattage and is more satisfactory for the purpose described, and altho I have shown and described specific constructions as illustrative of embodiments of the invention, I do not desire to restrict myself to the details of form, construction or arrangement of the source of light, or the parts thereof, as various changes and modifications may be made within the scope of the appended claims.

I claim:

1. A source of light comprising a bulb, an insulating tube within the bulb, an anode confined within the tube, a cathode confined within the tube and spaced from the anode and having a conduit extending through it.

2. A source of light comprising a bulb, an insulating tube within the bulb, an anode confined within the tube, a cathode confined within the tube and spaced from the anode and having a conduit extending through it substantially in line with the axis of the tube.

3. A source of light comprising a bulb, an insulating tube within the bulb, an anode confined within the tube, a cathode confined within the tube and spaced from the anode and having a conduit extending through it, and an insulating washer covering the outer end of the cathode.

4. A source of light comprising a bulb, an insulating tube within the bulb, an anode confined within the tube, a cathode confined within the tube and spaced from the anode and having a conduit extending through it substantially in line with the axis of the tube, and a gaseous filling within the bulb of such a pressure that an intense glow is concentrated in the conduit.

5. A source of light comprising a bulb, an insulating tube within the bulb, an anode confined within the tube, a cathode confined within the tube and spaced from the anode and having a conduit extending through it substantially in line with the axis of the tube, and an insulating washer covering the outer end of the cathode.

6. A source of light adapted to vary its intensity in accordance with variations in an electric circuit connected to it comprising an anode and a cathode having a conduit of substantial length extending through it, and an insulating washer covering the outer end of the cathode.

7. A source of light adapted to vary its intensity in accordance with variations in an electric circuit connected to it comprising an anode and a cathode having a conduit of substantial length extending through it in line with a portion of the anode, and an insulating washer covering the outer end of the cathode.

8. A source of light comprising a bulb, an insulating tube within the bulb, an anode confined within the tube, a cathode confined within the tube and spaced from the anode and having a conduit extending through it, and a gaseous filling within the bulb of such a pressure that an intense glow is concentrated in the conduit.

9. A source of light comprising a bulb, a pair of cylindrical axially aligned and axially spaced electrodes within the bulb, an axial conduit extending through the cathode, and a gaseous filling within the bulb at such a pressure that an intense glow is concentrated in the conduit.

10. A source of light comprising a bulb, a tubular member within the bulb, a pair of electrodes within the tube and spaced apart axially of the tube, the cathode one of which is formed with a conduit extending through it and a gas within the bulb at such a pressure that an intense concentrated glow is produced in the said conduit.

11. A source of light comprising a bulb, a pair of cylindrical axially alined and axially spaced electrodes within the bulb, and an axial conduit extending through the cathode of relatively small diameter as compared to the diameter of the cathode to produce a point source of light.

12. A source of light comprising a bulb, a pair of cylindircal axially alined and axially spaced electrodes within the bulb, and an axial conduit extending through the cathode of rectangular cross section of relatively small width as compared to its length to produce a line source of light.

13. A source of light comprising a bulb, anode and cathode electrodes axially alined and axially spaced within the bulb, an axial conduit extending through the cathode, and an insulating tube surrounding said electrodes having a flanged end portion surrounding the conduit opening at one end of said cathode.

14. A source of light comprising a bulb, a pair of cylindrical axially alined and axially spaced electrodes within the bulb, an axial conduit extending through the cathode, and an insulating material on the end of the cathode farthest removed from the anode surrounding the conduit opening.

15. A source of light comprising a vacuum-tight enclosure containing a gaseous atmosphere, a first electrode therein and a second electrode having an aperture at a point in its surface farthest removed from said first electrode, and a cavity of larger diameter extending from said aperture toward said first electrode.

16. A source of light comprising a vacuum tight inclosure, a chamber therein inclosing a first electrode, and a second electrode having an aperture at the point in its surface farthest removed from said first electrode.

17. A source of light comprising a vacuum tight inclosure, a chamber therein inclosing a first electrode, a second electrode constituting a portion of the wall of said chamber and having an opening in its surface of relatively small diameter as compared to the diameter of the second electrode.

THEODORE WILLARD CASE.